United States Patent [19]

Fundneider et al.

[11] Patent Number: 5,581,551
[45] Date of Patent: Dec. 3, 1996

[54] METHOD FOR TRANSMITTING DIGITAL SIGNALS IN AN ATM COMMUNICATION NETWORK

[75] Inventors: Oswald Fundneider, Icking; Karl-Anton Lutz, Munich; Norbert Loebig, Darmstadt, all of Germany

[73] Assignee: Siemens Aktiengesellschaft, Munich, Germany

[21] Appl. No.: 407,380

[22] Filed: Mar. 20, 1995

Related U.S. Application Data

[63] Continuation of Ser. No. 360,629, Dec. 21, 1994, abandoned.

[30] Foreign Application Priority Data

Dec. 21, 1994 [DE] Germany .......................... 43 43 720.6

[51] Int. Cl.$^6$ .............................. H04J 3/02; H04L 12/56
[52] U.S. Cl. ........................................ 370/395; 370/474
[58] Field of Search ................... 370/94.1, 94.2, 370/60.1, 79, 84, 99

[56] References Cited

U.S. PATENT DOCUMENTS

| | | | |
|---|---|---|---|
| 5,200,952 | 4/1993 | Bernstein et al. | 370/94.1 |
| 5,239,544 | 8/1993 | Balzano et al. | 370/94.2 |
| 5,390,175 | 2/1995 | Hiller et al. | 370/94.1 |

FOREIGN PATENT DOCUMENTS

| | | | |
|---|---|---|---|
| 2731963C2 | 4/1986 | Germany | H04L 5/22 |
| 4218053A1 | 12/1992 | Germany | H04L 12/48 |

*Primary Examiner*—Douglas W. Olms
*Assistant Examiner*—Min Jung
*Attorney, Agent, or Firm*—Hill, Steadman & Simpson

[57] ABSTRACT

A packeting time of 6 ms is required for filling the information part of an ATM cell with 48 octets of a 64 kbit/s channel. This transit time is impermissably long for PCM voice connections. This situation is alleviated in that the information part of the ATM cells is subdivided into 24 fields of two octets each. Two respective data octets of a channel are then entered therein.

7 Claims, 4 Drawing Sheets

METHOD FOR TRANSMITTING DIGITAL SIGNALS IN AN ATM COMMUNICATION NETWORK

This is a continuation of application Ser. No. 08/360,629, filed Dec. 21, 1994 now abandoned.

BACKGROUND OF THE INVENTION

The invention is directed to a method for transmitting digital signals in a plurality of transmission channels over an ATM communication network according to an asynchronous transfer mode.

In transmission systems that are operated according to an asynchronous transfer mode (ATM mode), the messages to be transmitted are transmitted in message cells having a fixed length. The message cells each respectively comprise an information part as well as a header part. The information part serves the purpose of accepting the messages, whereas the header part that precedes the information part has information about the allocation of a message cell to a virtual connection. The header part usually has a length of 5 octets, and the information part usually has a length of 48 octets.

A general desire is to provide a universal communication network for voice, text, data and picture (ISDN) on the basis of the asynchronous transfer mode in public and private networks. The problem arises, however, that, for example, the voice information transmitted in the previous transmission technique (pulse code modulation technique PCM) must be converted into message cells and vice versa. Such a conversion must be implemented in multiple fashion under certain circumstances, dependent on the configuration and integration of the ATM communication network. Such a configuration is shown in FIG. 3 by way of example. A uniform ATM transmission network is not yet present therein, but rather a plurality of what are referred to as ATM islands that are integrated in the PCM transmission work. During the course of expansion techniques at a later point in time, these would then probably grow together to form an entire ATM communication network. What this means for the introduction phase, however, is that a plurality of such ATM islands intervene under certain circumstances between a calling A-subscriber and a called B-subscriber. To this extent, thus a multiple conversion of the PCM voice information into ATM message cells and vice versa is necessary.

The conversion of the voice information into message cells is implemented at the interfaces of the PCM transmission network to the ATM communication network. Packeting/depacketing equipment are employed as interface equipment. The job of the PCM network is comprised in integrating the voice information transmitted according to the PCM transmission principle into the information part of the message cell. The job of the ATM network is composed in making the voice information integrated in the information part of the message cells accessible again to the PCM transmission network. If a calling A-subscriber were to exchange voice information with a B-subscriber via such a configuration, then no disadvantages whatsoever would deteriorate the quality of the connection, given a relatively short local call. This changes suddenly, however, with the length of the corresponding connection since a plurality of packeting/depacketing events always involve longer and longer delay times that cannot be tolerated in practice. Unavoidable echo transit times that prove disturbing during a telephone mode arise due to such delay times. For this reason, such technological problems are addressed in CCITT recommendation G131, Blue Book. It is recommended therein that what are referred to as echo suppression techniques are employed beginning with a basic signal transit time of 25 ms. Such techniques, for example, can be the employment of echo suppressors or echo cancelers. In practice, however, the employment of echo suppression systems can no longer represent an economical solution. The aim of the technical field when integrating ATM islands into an existing PCM transmission network is directed in this respect to integrating voice information in message cells in an optimally economical fashion, these message cells then being connected through over an ATM communication network according to the ATM transmission principle. The employment of echo suppressors or echo cancelers is thus avoided at the same time in order to obtain an optimally economical design.

German published application DE 42 18 053 A1 discloses such a method. This method is based on a transmission rate of 64 kbit/s of the voice information in the PCM transmission network. Given the employment of PCM 30 systems, the voice information are accommodated in thirty channels that form a PCM frame together with two further channels that serve the purpose of synchronization and of signalling. The successive PCM frames continue to be defined as a PCM system, whereby a plurality of such PCM systems are employed in practice. The duration of a PCM frame amounts to 125 µs. The information part of a message cell is then filled with voice information from a PCM 30 frame. The complete PCM 30 frame is thereby inserted into the information part of a message cell. The width of a PCM 30 channel amounts to 8 bits. The width of an octet of the information part of a message cell likewise comprises 8 bits. This thus means that the insertion of a complete PCM 30 frame into the information part of the message cell requires 32 octets. Since the information part comprises a total of 48 octets with a width of 8 bits, a total of 16 octets remain free in the method proposed therein. This ultimately means that the message cell is only partially filled. Although such a technique would in fact shorten the packeting time otherwise employed to a considerable extent, the transmission of partially filled cells in practice means that these are correspondingly to be transmitted more often. This in turn produces disadvantages for the traffic load of the overall ATM communication network that cannot be tolerated.

SUMMARY OF THE INVENTION

It is an object of the invention to specify a method with which the packeting/depacketing events can be shortened.

According to the present invention, each transmission channel is designed for a uniformly defined transmission bit rate. At least one ATM communication equipment unit is provided in which digital signals are transmitted in message cells. Each of the message cells has a cell header part and an information part. The information part is formed of a defined number of fields each having a respectively defined number of bit places. The transmission channels are combined to form at least one transmission channel group. The number of transmission channels belonging to the respective transmission channel group is defined such that at least two fields formed of successive bits of the digital signals appearing in the respective transmission channel are respectively allocated to each of these transmission channels in the information parts of successive message cells. The successive message cells are in turn resolved after a transmission within the ATM communication network according to the criterion of the allocation of the fields of the information parts of these message cells to the transmission channels of the respective transmission channel group.

The combining of transmission channels to form a transmission channel group is advantageous in the invention. The number of transmission channels belonging to the respective transmission channel group is thereby defined such that at least two respective fields are allocated to each of these transmission channels in the information parts of successive message cells. The successive message cells are then transmitted within the ATM communication network and are in turn resolved according to the criterion of the allocation of the fields of the information parts of these message cells to the transmission channels of the respective transmission channel group.

The transmission channels are PCM channels for the transmission of PCM-coded voice signals. This produces the advantage that voice signals can be packeted for the transmission and connection through in an ATM communication network. When leaving the ATM communication network, the corresponding PCM information are in turn depacketed and inserted into PCM channels.

At least one server system is connected to a switching network of the at least one ATM communication equipment unit. The header part of the incoming, packeted message cells is removed therein and evaluated. These message cells are then forwarded to the corresponding depacketing equipment unit based on the criterion of the information contained therein. This particularly produces the advantage that the respective message cells are forwarded to the correct depacketing equipment unit based on the criterion of the information contained in the header part.

A variable number may be employed instead of the strictly defined number of fields in the information part of a message cell. This produces the advantage of a faster packeting/depacketing.

n×64 kbit/s transmission channels are combined into transmission channel groups and are in turn resolved according to the method of the invention.

Packeting equipment units or depacketing equipment units are connected to the at least one ATM communication equipment unit. The packeting equipment units insure that the transmission channels are combined to form at least one transmission channel group, whereas the depacketing equipment units resolve the packeted transmission channels into the allocated transmission channel groups.

DESCRIPTION OF THE PREFERRED EMBODIMENTS

The simplest idea for voice introduction in the ATM communication network assumes that an ATM overlay network for broadband services already exists. This then overlays the entire national or international transit network.

The overall transit time in one direction is lengthened by 8 ms for the integration of voice channels into the information part INFO of a message cell Z. At the same time, however, the basic transit time per node is shortened on average by approximately 0.5 ms. The reason for this is that ATM communication networks have a shorter transit time than conventional PCM exchanges. The corresponding conditions are shown again in FIG. 4. As an example, a connection over five ATM nodes with packeting/depacketing events is shown here at the end of the respective connection. The transit times of the trunks are seen to be equal to the transit times in the PCM transmission network and therefore appear as "0" in the overall balance. The transit time of the message cells Z in the ATM nodes is shorter than the signal transit time in the PCM exchanges and therefore appears as a negative value in the overall balance. A complete compensation of the packeting/depacketing times can only be realized with difficulty in real communication networks. The additional signal transit time—5.5 ms in the present exemplary embodiment—must thus be accepted. What is critical, however, is that this additional delay time occurs only once and not repeatedly—as is possible given international connections. Multiple packeting/depacketing events can only be tolerated where techniques for echo suppression are already provided anyway.

Figure 4:
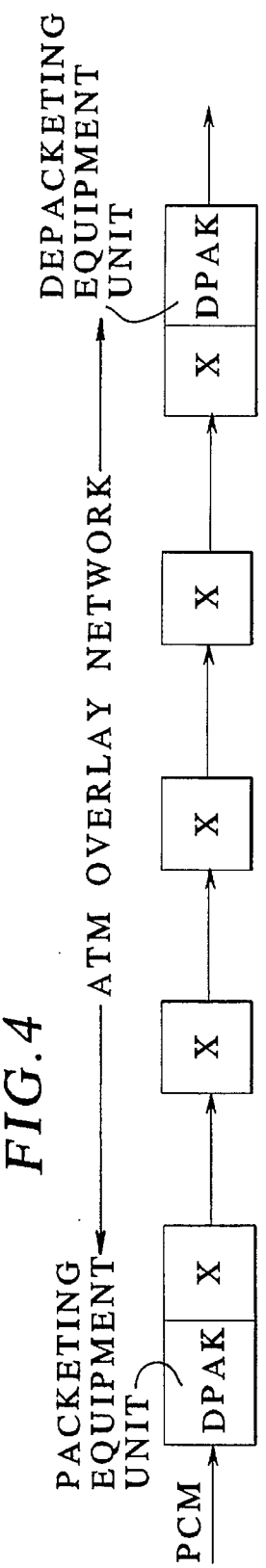
FIG. 4 is a transit time comparison between a PCM network and an ATM overlay network.

FIG. 4 shows a voice connection over a total of five nodes. Two of these nodes are to be designed as ATM nodes. Approximately 0.5 ms suffices for the compensation of transit time changes for the depacketing in an ATM island by comparison to the 2 ms specified for the network-wide compensation. A lengthening of the simply directed delay times by 12 ms results here based on the transit time comparison to a conventional PCM communication network. One must therefore count on an additional transit time of 6 ms for every ATM island to be crossed. So that no quality deteriorations are produced in comparison to conventional PCM exchanges, these ATM islands must act like PCM exchanges in terms of their transit time behavior. This means that 1500 μs are allowed as a 95% value for the "round trip delay" (CCITT, Blue Book Q.5.551).

Figure 1:
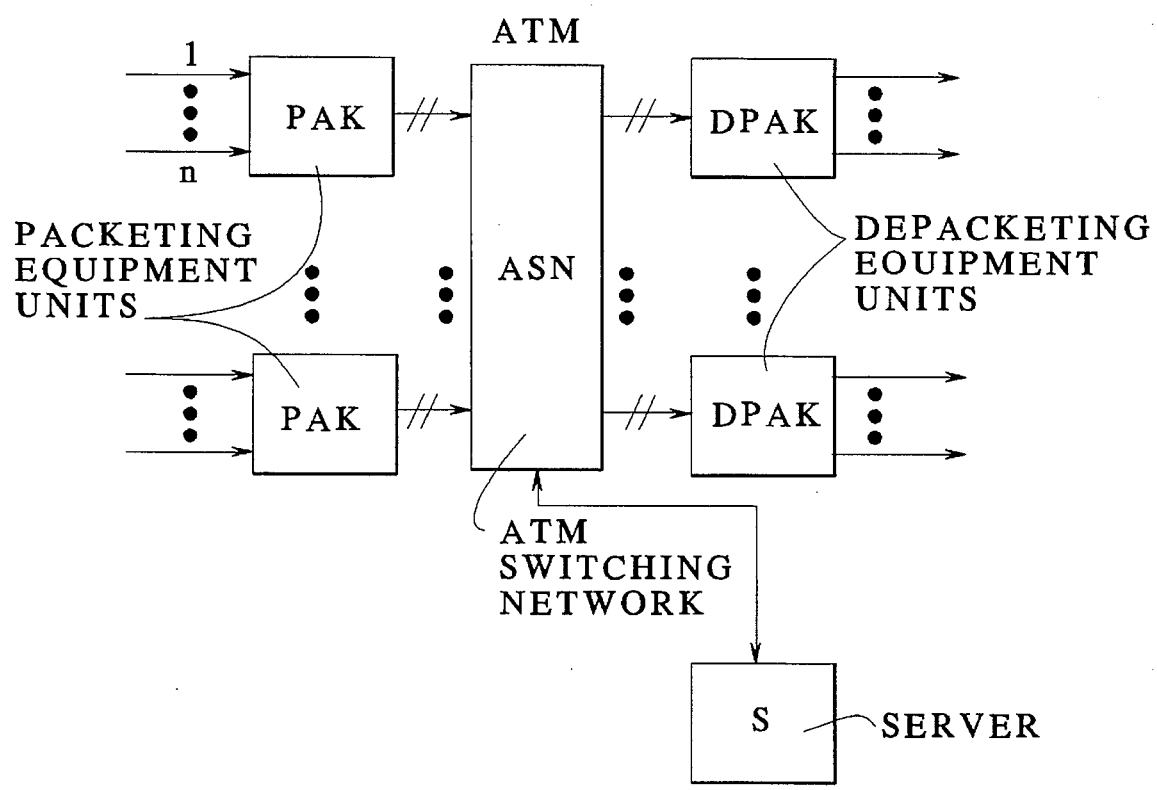
FIG. 1 is an ATM island in the voice network.

FIG. 1 discloses an arrangement of the invention. The method of the invention is executed by this arrangement. Packeting equipment units PAK are shown at the input side, these implementing the insertion of the PCM voice channels into the corresponding information parts INFO of the message cells Z to be transmitted. These packeting equipment units PAK are connected to an ATM switching network ASN. Furthermore, the depacketing equipment units DPAK are connected thereto. The packeting event implemented at the input is in turn cancelled thereat. The previously mentioned server system connected to the ATM switching network is shown at S in FIG. 1.

Figure 5:
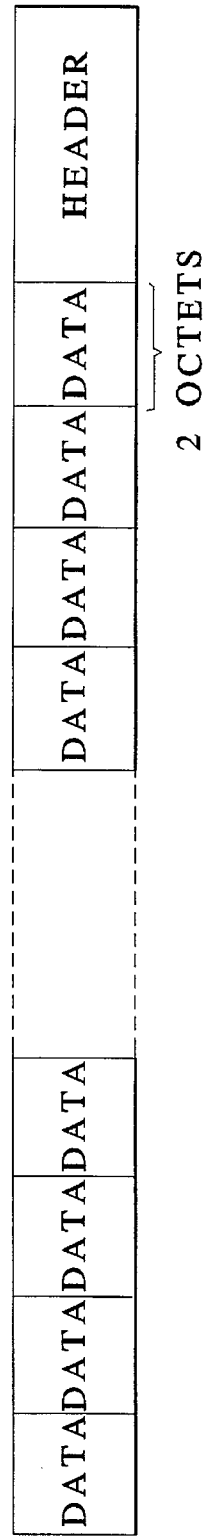
FIG. 5 shows the internal cell structure.

It is assumed below that the individual 64 kbit/s channels of the PCM 30 systems are to be packeted into the information parts INFO of the message cells Z. The analogous case applies to different multiplex systems. Furthermore, it is assumed that the packeting of voice signals is implemented; however, it must thereby be taken into consideration that other message signals of various multiplex systems can also be inserted into the information parts of message cells Z according to the principle of the invention. The principle of the solution provices that the information part of the message cells Z is to be subdivided in the packeting equipment units PAK into 24 fields of 2 octets each. Two respective data octets of a transmission channel are then entered therein. The message cells Z are connected through from the packeting equipment units PAK to the depacketing units DPAK. FIG. 5 discloses the corresponding conditions.

Figure 2:
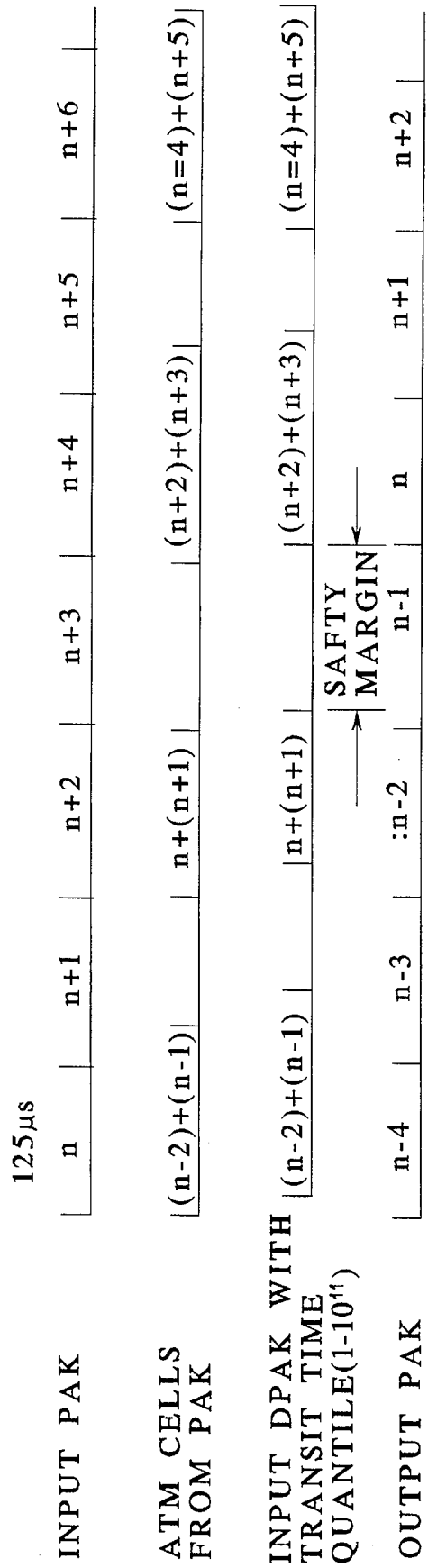
FIG. 2 is a transit time diagram for message cells.
Figure 3:
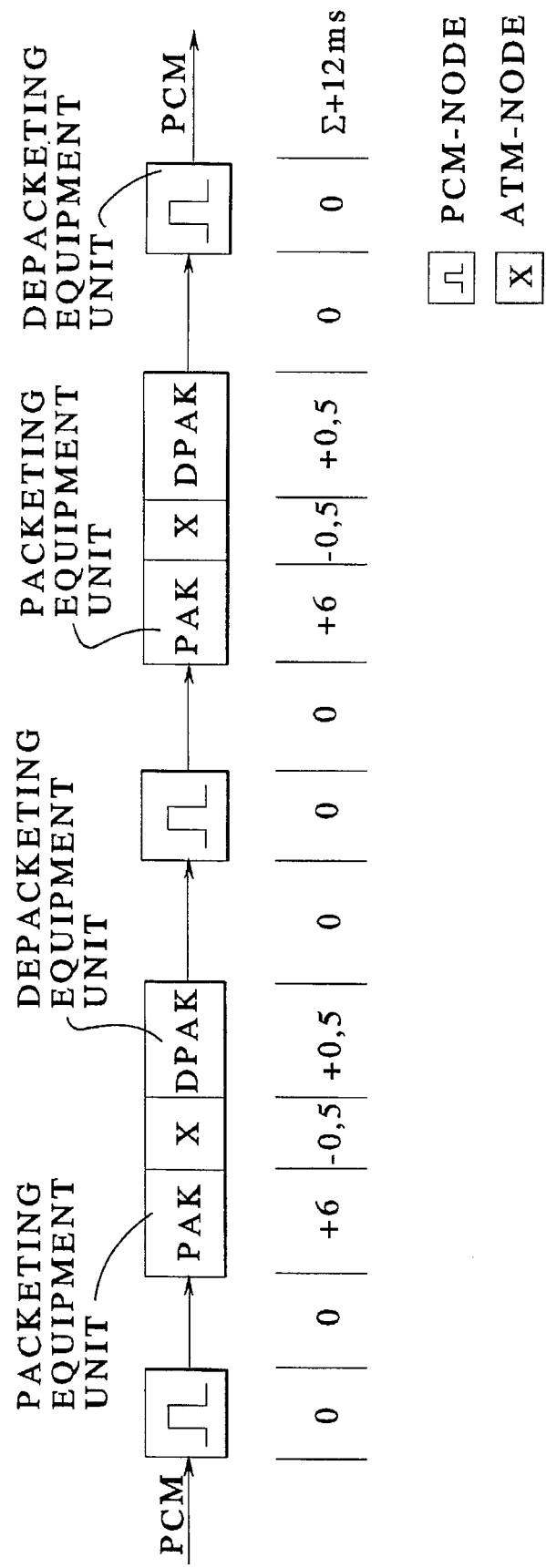
FIG. 3 is a transit time comparison between a PCM network with and without ATM nodes.

FIG. 2 shows a time balance for the packeting/depacketing events. The following parameters are thereby to be generally taken into consideration:

the packeting times the time for transmitting an ATM message cell out of the packeting equipment units PAK ($1\times10^{-11}$) quantile of the delay time in the ATM switching network ASN additional delays in system-associated buffers a safety margin.

Only the packeting time and the time for transmitting the ATM message cell Z from the packeting equipment units PAK can be achieved as the sole variable parameters by parallel sections of multiplex lines. It can also be derived from the diagram in FIG. 4 that only 2 octets per voice channel can be combined in order to achieve the stated goal, i.e. that 24 voice channels are used for filling an ATM message cell Z. In order to obtain optimally good usage of the ATM message cells Z, packeting equipment units PAK as well as depacketing equipment units DPAK must be made of such a size that a plurality of ATM message cells Z can be filled per directional bundle, given equal distribution of the traffic. It is thus assured that only a fraction of the ATM message cells Z is only partially occupied (a maximum of 1 per direction). This then leads to the aforementioned, large packeting equipment PAK/depacketing equipment units DPAK that are connected to the ATM switching network ASN via a plurality of multiplex lines operating with load sharing, or via one having a correspondingly high transport bit rate in order to shorten the transmission time.

It may also be derived from the diagram of FIG. 2 that, with the given assumptions, a maximum transit time of $6\times125$ µs occurs (the transit time compensation for the input is not shown) and that an average value of $5\times125$ µs results. The desired "round trip delay" is thus adhered to. As long as these ATM message cells Z remain within the ATM island, neither a national nor an international standardization is required.

A further proposal for reducing transit time is in shortening the information part INFO of the message cells Z from the currently standardized 48 octets to, for example, only 4 or 8 octets, and to connect through these "short" message cells Z in the ATM node together with the traditional message cells Z, and to thus forward them.

There is also the requirement in conjunction with the packeting of voice signals to transmit $n\times64$ kbit/s channels in the ATM communication network ($2<n<32$). This means that primary PCM systems (1544 or 2048 kbit/s) are likewise to be packeted in ATM message cells Z. These broadband channels can be respectively handled like n individual channels within the framework of contemporary time demands for voice channels. The proposed method guarantees that interrelated octets also remain together even when the sub-channels are packeted in different ATM message cells Z. In view of demands for substantially shorter delay times for primary systems, the information of a 125 µs frame could be respectively packeted in an ATM message cell Z, this corresponding to a packeting time of 125 µs. Alternatively, the ATM message cells could be respectively filled with the sequence of 48 octets, this corresponding to a packeting time of 250/187.5 µs given 1544/2048 kbit/s. Taking the maximum transit time through the ATM switching network and a safety margin into consideration, an overall delay of approximately 250 µs results in the former instance. In the latter instance, these values are increased in conformity with the lengthened packeting times. A further shortening of the delay times can be achieved in that a plurality of channels that belong to one directional bundle are again respectively combined in ATM message cells Z, and the packeting time is thereby correspondingly reduced.

Although various minor changes and modifications might be proposed by those skilled in the art, it will be understood that we wish to include within the scope of the patent warranted hereon all such changes and modifications as reasonably come within our contribution to the art.

We claim as our invention:

1. A method for transmitting digital signals appearing in transmission channels over an ATM communication network according to an asynchronous transfer mode, comprising the steps of:

providing at least one ATM communication equipment unit in which said digital signals are transmitted in message cells;

combining a given number of said transmission channels to form a transmission channel group;

providing each of the message cells with a cell header part and an information part, and subdividing the information part into a number of data fields equal to said given number of transmission channels in said transmission channel group so that each data field has an associated transmission channel, each data field having a selected number of bits equal to a number of successive data bits contained in at least two successive groups of data bits of the associated transmission channel;

in a packeting step, for each field entering into said bits of said field said two successive groups of data bits from the respective transmission channel associated with that field; and after a transmission of the ATM message cell within the ATM communication network, in a depacketing step extracting from each data field the two successive groups of data bits and providing them to the respective transmission channel of the respective data field.

2. A method according to claim 1 wherein said transmission channels are PCM transmission channels, said given number of transmission channels in said transmission channel group is 24, the ATM message cell information part is subdivided into 24 data fields, each of the two successive groups of data bits in each transmission channel represents one octet equaling eight data bits of the transmission channel, said selected number of bits in each data field of the ATM message cell equals sixteen, said information part has a total number of bits equal to 48 octets, and the width of the PCM channel is 8 bits.

3. A method according to claim 1 wherein said transmission channels are PCM channels for transmission of PCM coded voice signals.

4. A method according to claim 1 including the steps of:

connecting at least one server system to a switching network of the at least one ATM communication equipment unit;

removing the cell header part of successive message cells and interpreting them in said server system; and forwarding the successive message cells onward to a corresponding depacketing equipment unit according to information contained in the header part.

5. A method according to claim 1 wherein the number of fields in the information part of a message cell is variable.

6. A method according to claim 1 wherein the at least one transmission channel group has $n\times64$ kbit/s transmission channels combined therein where $2<n<32$.

7. A system for transmitting digital signals appearing in transmission channels over an ATM communication network according to an asynchronous transfer mode, comprising:

at least one ATM communication equipment unit in which said digital signals are transmitted in message cells;

means for combining a given number of said transmission channels to form a transmission channel group;

each of the message cells with a cell header part and an information part, and the information part being subdivided into a number of data fields equal to said given number of transmission channels in said transmission channel group so that the data field has an associated transmission channel, each data field having a selected number of bits equal to a number of successive data bits contained in at least two successive groups of data bits of the associated transmission channel;

means for packeting by entering into said bits of each field said two successive groups of data bits from the respective transmission channel associated with that field; and means for depacketing by extracting from each data field, after a transmission of the ATM message cell within the ATM communication network, the two successive groups of data bits and providing them to the respective transmission channel of the respective data field.

* * * * *